Figure 1:
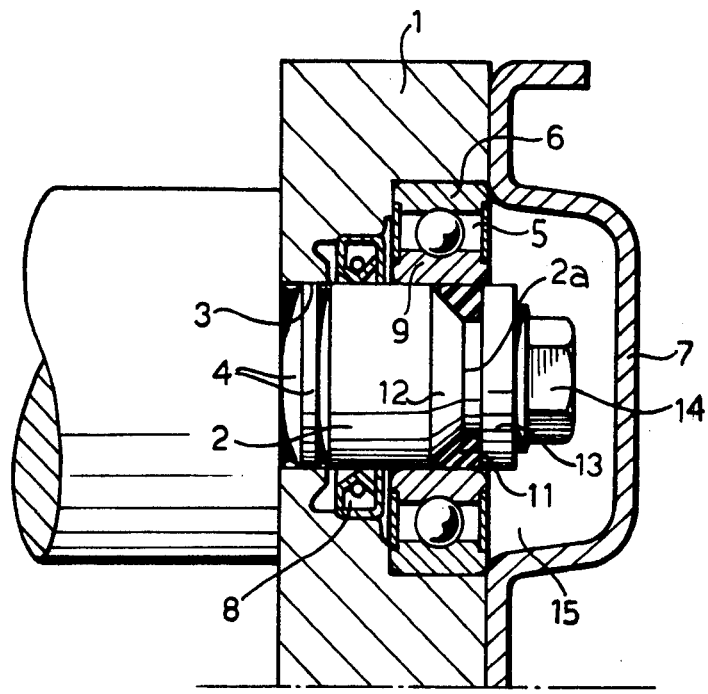

United States Patent [19]

Messori et al.

[11] 4,456,314

[45] Jun. 26, 1984

[54] DEVICE FOR LOCKING THE INNER RING OF A ROLLING BEARING ON A ROTARY SHAFT

[75] Inventors: Pier P. Messori, Pino Torinese; Pier L. Scapecchi, Saronno, both of Italy

[73] Assignee: Fiat Auto S.p.A., Turin, Italy

[21] Appl. No.: 473,917

[22] Filed: Mar. 10, 1983

[30] Foreign Application Priority Data

Mar. 10, 1982 [IT] Italy .................. 67297 A/82

[51] Int. Cl.³ .................................... F16C 35/073
[52] U.S. Cl. .................................... 308/236; 403/227
[58] Field of Search .............. 308/236, 184 R, 189 R, 308/207 R; 403/220, 227, 297, 372, 373, 370, 368, 371

[56] References Cited

U.S. PATENT DOCUMENTS

| | | | |
|---|---|---|---|
| 2,390,168 | 12/1945 | Piot | 403/227 |
| 2,650,866 | 9/1953 | Knudson | 308/236 |
| 3,033,622 | 5/1962 | Renner | 403/372 X |
| 3,861,815 | 1/1975 | Landaeus | 403/227 X |
| 4,121,675 | 10/1978 | Nixon | 403/227 X |

*Primary Examiner*—Stuart S. Levy
*Assistant Examiner*—David Werner
*Attorney, Agent, or Firm*—Sughrue, Mion, Zinn, Macpeak and Seas

[57] ABSTRACT

The inner ring of a rolling bearing is mounted on one end of a rotary shaft where the shaft is of reduced diameter. The inner ring of the bearing bears on the larger diameter part of the shaft but projects beyond this part to define an annular space with the reduced diameter part of the shaft. A circular-sectioned ring of elastomeric material is located in this annular space. This ring is pressed into the annular space by a washer of smaller diameter than the internal diameter of the bearing, which is mounted on the end of the shaft and is locked against the ring by screw means engaging the end of the shaft.

1 Claim, 2 Drawing Figures

U.S. Patent    Jun. 26, 1984    4,456,314

DEVICE FOR LOCKING THE INNER RING OF A ROLLING BEARING ON A ROTARY SHAFT

The present invention relates to a support assembly for rotary members, comprising a support structure and a shaft rotatably mounted in the support structure with the interpositioning of a rolling bearing.

The object of the present invention is to provide a device for locking the inner ring of the rolling bearing on the shaft, which has a simple and economical structure and is easy and quick to assemble.

In order to achieve this object, the invention provides a support assembly of the type specified above, characterised in that the rolling bearing is located adjacent one end of the shaft, the shaft is of reduced diameter at said end and the inner ring of the bearing bears on the larger diameter part of the shaft but projects beyond said part to define an annular space with the reduced diameter part of the shaft, in that a circular-sectioned ring of elastomeric material is located in the annular space, and in that the ring is pressed into the annular space by a washer of smaller diameter than the internal diameter of the bearing, which is mounted on the end of the shaft and is locked against the ring by screw means engaging the end of the shaft.

By virtue of the arrangement described above, the inner ring of the bearing is locked securely onto the rotary shaft in a simple and economical manner. Indeed, when the ring of elastomeric material is pressed into its seat by the washer, it deforms so as to fill this seat and act against the surfaces of the inner ring of the bearing and the rotary shaft which face into the space. Any small displacements of the inner ring of the bearing and the rotary shaft relative to each other cause deformation of the annular washer which consequently reacts to recover these displacements.

Figure 2:
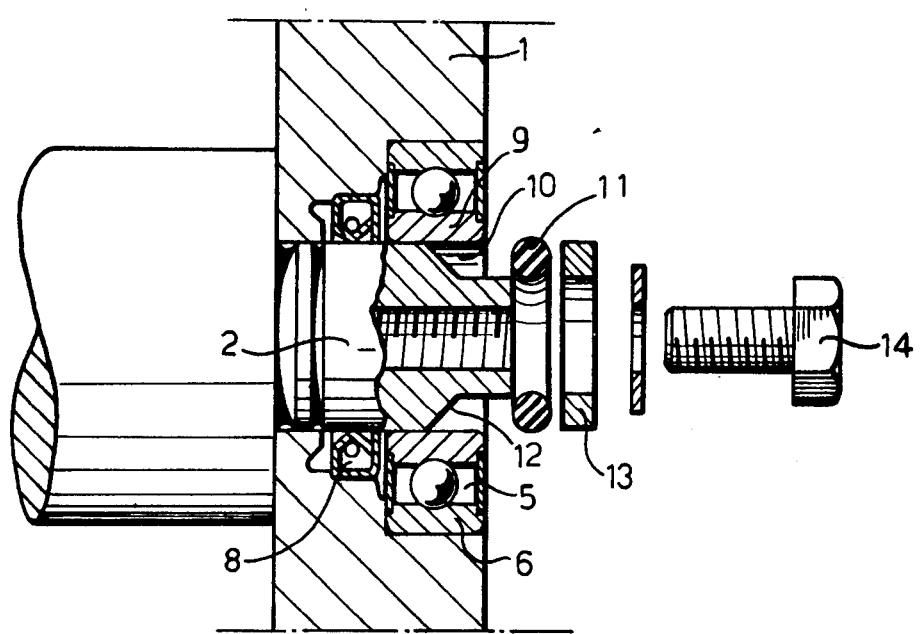

The present invention will now be described with reference to the appended drawings, provided purely by way of non-limiting example, in which:

FIG. 1 is a sectional view of a support assembly for rotary members according to the invention, and FIG. 2 illustrates the parts of FIG. 1 in the dis-assembled condition.

The example illustrated in the drawings relates to a part of the structure of a Roots-type rotary volumetric compressor usable, for example, for supercharging an internal combustion engine. This compressor has two rotors which are rotatable in a chamber in its support casing and are connected to two parallel shafts.

In FIG. 1, reference numeral 1 indicates the support structure of the compressor and reference numeral 2 indicates one of the two shafts which are fixed for rotation with the rotors of the compressor. The shaft 2 is mounted in a hole 3 in the structure 1 and is provided with two circumferential grooves 4 which constitute a labyrinth seal for isolating the inner rotor chamber of the compressor (not illustrated) from the external environment.

The end 2a of the shaft 2 is rotatably supported by the structure 1 with the interpositioning of a rolling bearing 5. The rolling bearing 5 has an outer ring 6 which is locked in its seat in the support structure 1 by means of a cover 7 screwed to the structure 1.

An annular lipped sealing gland 8 is mounted adjacent the rolling bearing 5.

The shaft 2 has a reduced diameter at its end 2a. The inner ring 9 of the bearing 5 bears on the larger diameter part of the shaft 2 but projects beyond this part to define an annular space 10 (see FIG. 2) with the reduced diameter part.

A circular-sectioned ring 11 (an O-ring) of elastomeric material is located in the annular space 10, as illustrated in FIG. 2.

The ring 11 is pressed into the annular space 10, against the shoulder 12 of the shaft 2, by means of a washer 13 which is mounted on the end 2a of the shaft 2 and is locked in position by a screw 14 engaged in an axial screw-threaded hole in the end 2a.

When the ring 11 is pressed into its seat by the washer 13, it deforms in the manner illustrated in FIG. 1 so as to fill the annular space 10 and act against the facing surfaces of the inner ring 9 of the rolling bearing 5 and the shaft 2, thus locking the bearing onto the shaft itself.

In the particular example illustrated, the rolling bearing 5 is a sealed bearing whereby the chamber 15 defined by the cover 7 is separated from the lubricating environment of the bearing. In this case, the ring 11 also acts as a seal to prevent any lubricating oil from being drawn between the inner ring 9 and the shaft 2.

Naturally, the principle of the invention remaining the same, the constructional details and forms of embodiment may be varied widely with respect to that described and illustrated purely by way of example, without thereby departing from the scope of the present invention.

We claim:

1. A support assembly for rotary members comprising a support structure, a shaft rotatably mounted in the support structure and a rolling bearing including an inner ring interposed between the support structure and said shaft wherein:

the rolling bearing is located adjacent one end of said shaft;

said one end of said shaft has a first portion with a diameter substantially equal to the internal diameter of said ring for accurately locating said bearing in centered condition on said first portion of said shaft, a second portion has a reduced diameter and a conical portion is disposed intermediate said first and said second portions;

a portion of said inner ring is mounted on said first portion of said shaft with the remaining portion extending coaxially with respect to said second reduced diameter portion to define an annular space;

a circular-sectioned sealing ring of elastomeric material is located in said annular space;

a washer of smaller diameter than the internal diameter of said inner ring is mounted on said second portion of said shaft; and screw means engage said second portion of said shaft to lock said washer against said sealing ring and press said sealing ring into said space against said conical portion which forces said sealing ring outwardly into engagement with said inner ring to lock said inner ring onto said shaft.

* * * * *